United States Patent
Georgin et al.

(10) Patent No.: US 9,771,057 B2
(45) Date of Patent: Sep. 26, 2017

(54) STAGED METHOD TO DETECT BRAKE FAIL CONDITIONS IN BRAKE CONTROL SYSTEMS

(71) Applicant: GOODRICH CORPORATION, Charlotte, NC (US)

(72) Inventors: Marc Georgin, Dayton, OH (US); Richard Paul Metzger, Jr., Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 112 days.

(21) Appl. No.: 14/979,029

(22) Filed: Dec. 22, 2015

(65) Prior Publication Data
US 2017/0174201 A1 Jun. 22, 2017

(51) Int. Cl.
B60T 17/22 (2006.01)
B60T 8/17 (2006.01)
B64C 25/42 (2006.01)
B64C 25/44 (2006.01)

(52) U.S. Cl.
CPC .......... *B60T 17/221* (2013.01); *B60T 8/1703* (2013.01); *B64C 25/42* (2013.01); *B64C 25/44* (2013.01)

(58) Field of Classification Search
CPC ..... B60T 17/221; B60T 8/1703; B64C 25/42; B64C 25/44
See application file for complete search history.

(56) References Cited

U.S. PATENT DOCUMENTS

| | | | |
|---|---|---|---|
| 3,920,278 A * | 11/1975 | Hirzel | B60T 8/1703 188/181 A |
| 3,926,479 A | 12/1975 | Bissell et al. | |
| 4,007,970 A | 2/1977 | Romero | |
| 8,332,114 B2 | 12/2012 | Whittingham | |
| 2008/0154470 A1 | 6/2008 | Goranson et al. | |

FOREIGN PATENT DOCUMENTS

| | | |
|---|---|---|
| CN | 102706505 | 10/2012 |
| GB | 2470251 | 11/2010 |

OTHER PUBLICATIONS

Extended European Search Report dated May 29, 2017 in European Application No. 16205316.9.

* cited by examiner

*Primary Examiner* — Russell Frejd

(57) ABSTRACT

A system for two-stage determination of a brakefail of an aircraft brake system includes an aircraft brake. The aircraft brake is configured to receive a current command value, convert the current command value to a braking pressure and output a detected pressure value corresponding to the braking pressure. The system also includes a brake control unit (BCU) configured to determine a pressure command value, convert the pressure command value to the current command value and to determine whether a brakefail event has occurred based on the pressure command value, the current command value and the detected pressure value.

15 Claims, 4 Drawing Sheets

STAGED METHOD TO DETECT BRAKE FAIL CONDITIONS IN BRAKE CONTROL SYSTEMS

FIELD

The present disclosure relates to aircraft braking systems. In particular, the disclosure relates to systems and methods for determining brakefail conditions of aircraft brakes.

BACKGROUND

Aircraft brake systems typically employ a series of friction disks compressed together to stop the aircraft. Some aircraft brake systems adjust the compression of the friction disks by controlling a servo valve to adjust the pressure of a hydraulic actuator. Other aircraft brake systems adjust the compression of the friction disks by controlling electronic actuators. The aircraft brake systems may control the compression of the friction disks based on a feedback loop including the received braking request and feedback from the servo valve or actuators.

SUMMARY

Described herein is a system in accordance with various embodiments for two-stage determination of a brakefail of an aircraft brake system. The system includes an aircraft brake configured to receive a current command value, convert the current command value to a braking pressure and output a detected pressure value corresponding to the braking pressure. The system also includes a brake control unit (BCU) configured to determine a pressure command value, convert the pressure command value to the current command value and to determine whether a brakefail event has occurred based on the pressure command value, the current command value and the detected pressure value.

In any of the foregoing systems, the BCU is configured to determine that the brakefail event has occurred in response to determining that the detected pressure value is greater than or less than the pressure command value by at least a predetermined pressure tolerance.

In any of the foregoing systems, the BCU is further configured to determine that the brakefail event has occurred in response to determining that the current command value is within a predetermined current tolerance of a maximum current value or a minimum current value.

In any of the foregoing systems, the BCU is further configured to determine that the brakefail event has occurred in response to determining that the detected pressure value is greater than or less than the pressure command value by at least the predetermined pressure tolerance or that the current command value is within the predetermined current tolerance of the maximum current value or the minimum current value for a predetermined period of time.

In any of the foregoing systems, the BCU is configured to determine that the brakefail event has stopped occurring in response to determining that the detected pressure value is within the predetermined pressure tolerance of the pressure command value and that the current command value is less than the maximum current value minus the predetermined current tolerance and is greater than a sum of the minimum current value and the predetermined current tolerance for the predetermined period of time.

In any of the foregoing systems, the pressure command value is received from a brake executive unit and is determined based on a pilot desired pressure value and a desired pressure command value.

In any of the foregoing systems, the current command value is determined using a feedback loop based on the pressure command value and the detected pressure value when the brakefail event has not occurred.

In any of the foregoing systems, the current command value is determined using an open loop based on the pressure command value when the brakefail event has occurred.

Also described is a system in accordance with various embodiments for two-stage determination of a brakefail of an aircraft brake system. The system includes an aircraft brake having a plurality of electronic actuators each configured to receive a current command value, to convert the current command value into a force and to output a detected or calculated force value. The system also includes a brake control unit (BCU) configured to determine a force command value, convert the force command value to the current command value and to determine whether a brakefail event has occurred based on the force command value, the current command value and the detected or calculated force value from each of the plurality of electronic actuators.

In any of the foregoing systems, the BCU is configured to determine that an actuator fail event has occurred for an electronic actuator of the plurality of electronic actuators in response to determining that the detected or calculated force value for the electronic actuator is greater than or less than the force command value by at least a predetermined force tolerance.

In any of the foregoing systems, the BCU is further configured to determine that the actuator fail event has occurred for the electronic actuator in response to determining that the current command value is within a predetermined current tolerance of a maximum current value or a minimum current value for the electronic actuator.

In any of the foregoing systems, the BCU is further configured to determine that the brakefail event has occurred in response to determining that the actuator fail event has occurred for a predetermined number of the plurality of electronic actuators.

In any of the foregoing systems, the BCU is further configured to determine that the actuator fail event has occurred in response to determining that the detected or calculated force value is greater than or less than the force command value by at least the predetermined force tolerance or that the current command value is within the predetermined current tolerance of the maximum current value or the minimum current value for a predetermined period of time.

In any of the foregoing systems, the BCU is configured to determine that the actuator fail event has stopped occurring in response to determining that the detected or calculated force value is within the predetermined force tolerance of the force command value and that the current command value is less than the maximum current value minus the predetermined current tolerance and is greater than a sum of the minimum current value and the predetermined current tolerance for the predetermined period of time.

In any of the foregoing systems, the BCU is configured to determine that the brakefail event has stopped occurring in response to determining that the actuator fail event is occurring for less than the predetermined number of the plurality of electronic actuators.

Also described is a method in accordance with various embodiment for two-stage determination of a brakefail of an aircraft brake system. The method includes determining, by a brake control unit (BCU) a pressure command value or a force command value. The method also includes converting, by the BCU, the pressure command value or the force command value to a current command value. The method also includes receiving, by the BCU, a detected pressure value or a detected or calculated force value. The method also includes determining, by the BCU, whether a brakefail event has occurred based on the pressure command value or the force command value, the current command value and the detected pressure value or the detected or calculated force value.

Any of the foregoing methods may also include determining, by the BCU, that the brakefail event has occurred in response to determining that at least one of the detected pressure value is greater than or less than the pressure command value by at least a predetermined pressure tolerance or that the current command value is within a predetermined current tolerance of a maximum current value or a minimum current value for a predetermined period of time.

Any of the foregoing methods may also include determining, by the BCU, that the brakefail event has stopped occurring in response to determining that the detected pressure value is within the predetermined pressure tolerance of the pressure command value and that the current command value is less than the maximum current value minus the predetermined current tolerance and is greater than a sum of the minimum current value and the predetermined current tolerance for a predetermined period of time.

Any of the foregoing methods may also include determining, by the BCU, that an actuator fail event has occurred for an electronic actuator of a plurality of electronic actuators of an aircraft brake in response to determining that at least one of the detected or calculated force value for the electronic actuator is greater than or less than the force command value by at least a predetermined force tolerance or the current command value is within a predetermined current tolerance of a maximum current value or a minimum current value for the electronic actuator for a predetermined period of time.

Any of the foregoing methods may also include comprising determining, by the BCU, that the brakefail event has occurred in response to determining that the actuator fail event has occurred for a predetermined number of the plurality of electronic actuators.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
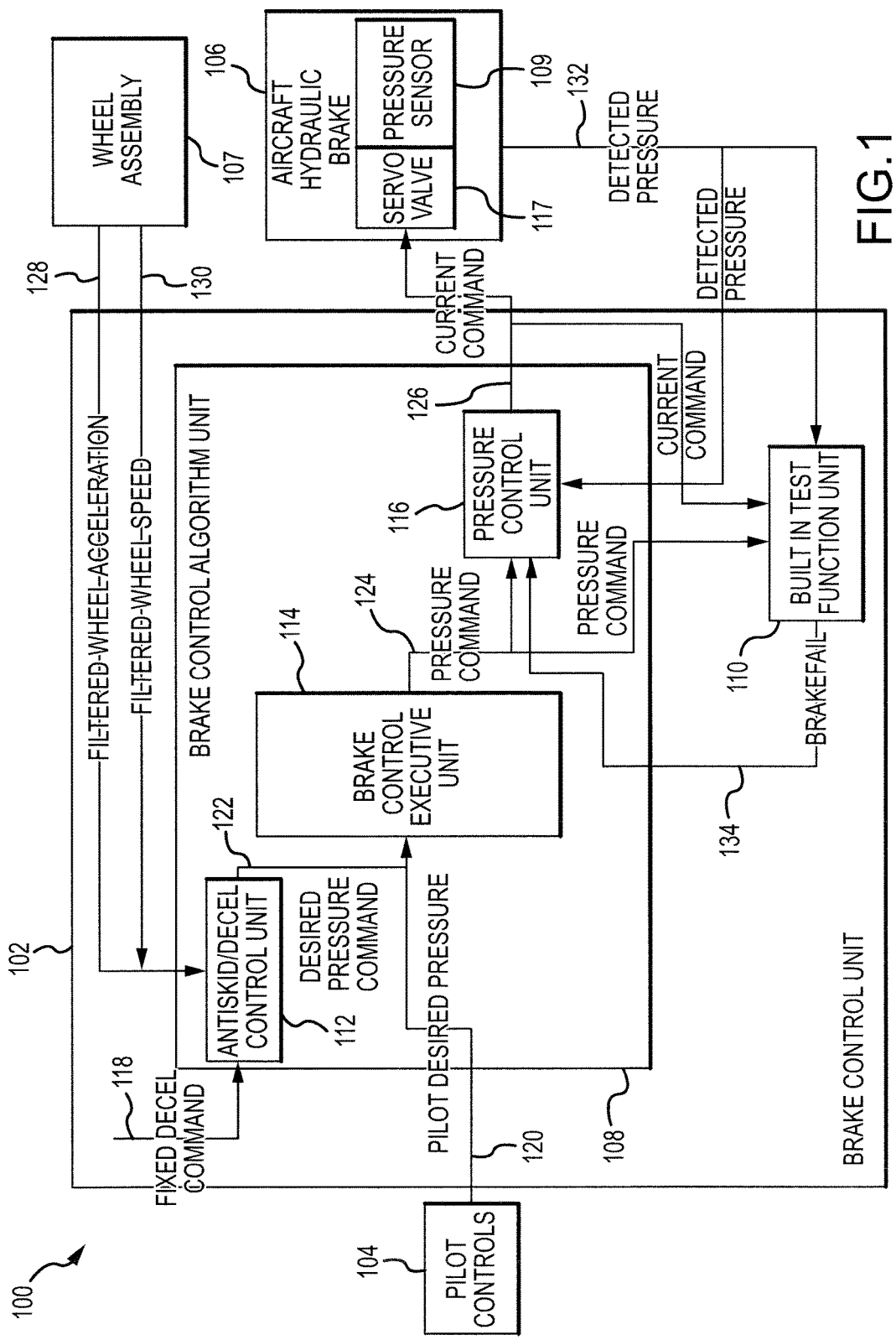
FIG. 1 is a block diagram showing a braking system of an aircraft for implementing a two-stage determination of a brakefail event of the braking system, in accordance with various embodiments.

Referring to FIG. 1, an aircraft brake system, or system 100, may provide a two-stage approach for determining a brakefail condition of an aircraft hydraulic brake 106. The system 100 includes a brake control unit (BCU) 102, a set of pilot controls 104, the aircraft hydraulic brake 106 and a wheel assembly 107.

The aircraft hydraulic brake 106 may be a pressure-operated brake. A servo valve 117 includes an actuation mechanism that can open and/or close to some degree, allowing more or less pressurized fluid to drive a piston and cause compression. Thus, the servo valve 117 may receive an instruction to increase pressure to one or more friction disks of the aircraft hydraulic brake 106. In response, the servo valve 117 may increase the opening to allow more pressurized fluid to drive the ram, causing the friction disks to compress. The compression of the friction disks causes deceleration of the wheel assembly 107. This pressure may be referred to as a braking pressure. In various embodiments, equipment other than the servo valve 117 may be used to apply pressure to the friction disks.

The BCU 102 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

The aircraft hydraulic brake 106 may be controlled by the pilot controls 104. For example, the BCU 102 may receive a pilot desired pressure value 120 that corresponds to a desired amount of braking. For example, the pilot desired pressure value 120 can be generated or altered in response to a depression of a brake pedal within a cockpit of the aircraft. The pilot desired pressure value 120 can also be generated or altered in response to an instruction to retract landing gear of the aircraft.

Similarly, the aircraft hydraulic brake 106 may be controlled by an antiskid/deceleration control unit 112 that is part of a brake control algorithm unit 108. The brake control algorithm unit 108 that controls the braking of the aircraft based on an algorithm. The brake control algorithm unit 108 may include the antiskid/deceleration control unit 112, a brake control executive unit 114 and a pressure control unit 116.

The antiskid/deceleration control unit 112 may receive a fixed deceleration command value 118 from another unit of the BCU 102, a filtered wheel speed value 130 from the wheel assembly 107 and a filtered wheel acceleration value 128 from the wheel assembly 107. The antiskid/deceleration control unit 112 can output a desired pressure command value 122 corresponding to a desired amount of pressure to be applied to the aircraft hydraulic brake 106 based on the fixed deceleration command value 118, the filtered wheel speed value 130 and the filtered wheel acceleration value 128. The desired pressure command value may be based on an algorithm for reducing the likelihood of the aircraft skidding and/or based on an automatic deceleration algorithm.

The brake control executive unit 114 receives both the pilot desired pressure value 120 and the desired pressure command value 122 and issues a pressure command value 124 based on the pilot desired pressure value 120 and the desired pressure command value 122. In various embodiments, the pressure command value 124 may be equal to the minimum value of the desired pressure command value 122 and the pilot desired pressure value 120. The pressure command value 124 corresponds to a desired amount of pressure to be applied to the aircraft hydraulic brake 106.

The pressure control unit 116 may receive the pressure command value 124 and may convert the pressure command value 124 into a current command value 126. The current command value 126 may be received by the servo valve 117 of the aircraft hydraulic brake 106. The servo valve 117 may be designed to convert the current command value 126 into a pressure. The pressure may be applied to one or more disks of a disk brake system of the aircraft hydraulic brake 106. The relationship between received current of the servo valve 117 and the amount of pressure applied may generally be described as a linear relationship between current and pressure. In various embodiments, the pressure control unit 116 may use the above relationship to determine the current command value 126 based on the known pressure command value 124 or may use another algorithm for determining the current command value 126 based on the pressure command value 124. The pressure control unit 116 may also determine the current command value 126 based on a detected pressure value 132 corresponding to a detected pressure applied to the one or more disks of the aircraft hydraulic brake 106. In that regard, the determination of the current command value 126 may be based on a feedback system such that the current command value 126 is adjusted in an attempt to cause the detected pressure value 132 to be equal to the pressure command value 124.

The aircraft hydraulic brake 106 may include a pressure sensor 109 for detecting the pressure applied by the servo valve 117. The pressure sensor 109 may transmit the detected pressure value 132 to the pressure control unit 116 for feedback control of the servo valve 117.

A built-in test function unit 110 may be designed to determine whether a component failure of the aircraft hydraulic brake 106 has occurred and, in response, generate a brakefail value 134 using a two-stage approach. The built-in test function unit 110 may determine the brakefail value 134 based on the pressure command value 124 from the brake control executive unit 114, the current command value 126 from the pressure control unit 116 and the detected pressure value 132 from the pressure sensor 109 of the aircraft hydraulic brake 106.

The first stage may be a fine stage and the second stage may be a course stage. The fine stage may be based on a comparison of the pressure command value 124 to the detected pressure value 132. For example, if the detected pressure value 132 is within a predetermined pressure tolerance of the pressure command value 124, then the fine stage may indicate that no brakefail has occurred. In various embodiments, the pressure tolerance may be 200 pounds per square inch (psi, 1.38 Megapascal (MPa)).

However, events may occur in which a brakefail condition is present but the detected pressure value 132 is still within the pressure tolerance of the pressure command value 124. For example, a pilot may request 1,150 psi (7.929 MPa) via the pilot controls 104. The pressure sensor 109 may have failed and report that the detected pressure value 132 is 1000 psi (6.895 MPa) regardless of the actual pressure applied by the servo valve 117. If the pressure tolerance value is 200 psi (1.38 MPa), the first stage of detecting the brakefail will indicate that no brakefail has occurred. In order to compensate for such a situation, the built-in test function unit 110 may implement the course stage of brakefail determination. The course stage may be based on the current command value 126.

When the pressure sensor 109 is in such a fail state, the pressure control unit 116 may continue to increase the current command value 126, if the detected pressure value is less than the pressure command value 124, in an attempt to cause the detected pressure value 132 to rise to the pressure command value 124. Similarly, if the detected pressure value 132 is greater than the pressure command value 124, the pressure control unit 116 may continue to reduce the current command value 126 in an attempt to cause the detected pressure value 132 to decrease to the pressure command value 124. Eventually, in either situation, the current command value 126 will continue to increase to a maximum current value or decrease to a minimum current value. For example, the maximum current value may be 30 milliamps, which may be a maximum current that may be provided by the pressure control unit 116. Similarly, a minimum current value may be 2 milliamps, which may be a minimum current that may be provided by the pressure control unit 116.

In order to determine whether a brakefail has occurred using the course stage, the built-in test function unit 110 will determine whether the current command value 126 is within a predetermined current tolerance of the maximum current or the minimum current. If the detected pressure value 132 is within the pressure tolerance of the pressure command value 124 and the current command value 126 is at a value other than within the current tolerance of the maximum current or minimum current for a predetermined amount of time, then the built-in test function unit 110 may indicate that no brakefail has occurred. Stated differently, the built-in test function unit 110 may determine that a brakefail has occurred if the current command value 126 is within the current tolerance of the maximum current or the minimum current for the predetermined amount of time. This indication may be provided, for example, via the brakefail value 134. The brakefail value 134 can be provided to the pressure control unit 116 such that open loop pressure control can be implemented. Otherwise, the built-in test function unit 110 may indicate that a brakefail has occurred.

Figure 2:
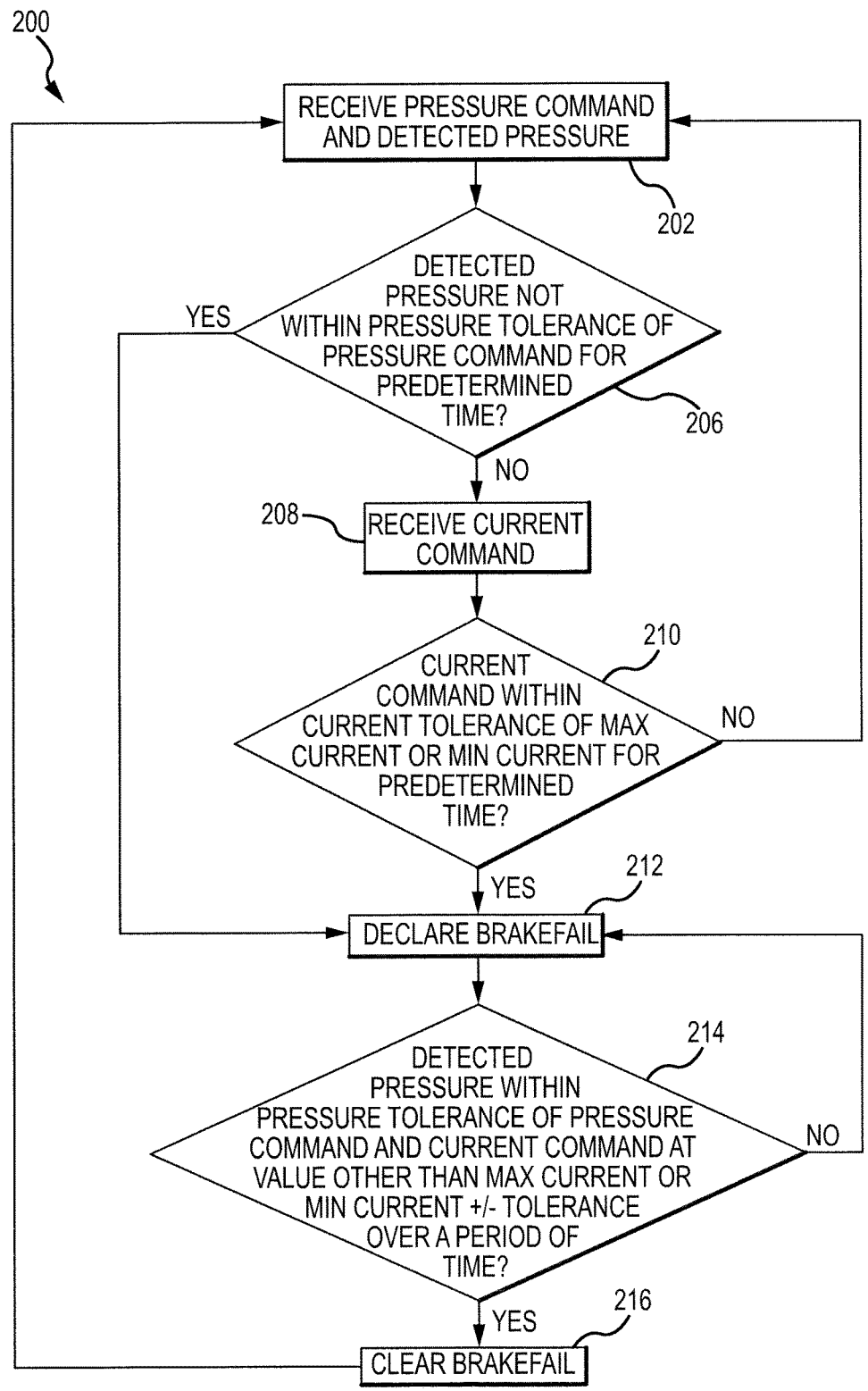
FIG. 2 is a flowchart showing a method for a two-stage determination of the brakefail event of FIG. 1, in accordance with various embodiments.

Turning now to FIG. 2, a method 200 for determining whether a brakefail event has occurred in an aircraft brake using a two-stage approach may begin at block 202. The method 200 may be performed by a built-in test function unit similar to the built-in test function unit 110 of FIG. 1.

In block 202, the built-in test function unit may receive a pressure command from a brake control algorithm unit. The built-in test function unit may also receive a detected pressure corresponding to a detected pressure of an aircraft brake.

In block 206, the built-in test function unit may determine whether the detected pressure is within the predetermined pressure tolerance of the pressure command. For example, the built-in test function unit may determine whether the detected pressure is within 200 psi (1.38 MPa) of the pressure command. If not, the built-in test function unit may declare a brakefail in block 212. In various embodiments, the built-in test function unit may not declare the brakefail unless the difference between the detected pressure and the pressure command remains greater than the pressure tolerance for a predetermined amount of time, such as 2 seconds. This delay reduces the likelihood of false brakefail alerts, for example, by allowing sufficient time for a new or changed braking command to be implemented in the brakes.

If the detected pressure is within the pressure tolerance of the pressure command, the built-in test function unit may receive a current command in block 208, for example, from a pressure control unit.

In block 210, the built-in test function unit may determine whether the current command is within a current tolerance of the maximum current or the minimum current. The current tolerance may be a predetermined value, such as 0.1 milliamp, 0.2% of the total range of possible current values, or the like. If the current command is not within the current tolerance of the maximum current or the minimum current, then the process may return to block 202 and the built-in test function unit may declare that no brakefail has occurred. However, if the current command is within the current tolerance of the maximum current or the minimum current, the method 200 may proceed to block 212 where the built-in test function unit will declare a brakefail. In various embodiments, the brakefail will not be declared unless the current command remains within the current tolerance of the maximum current or the minimum current for a predetermined amount of time, such as 2 seconds. This reduces the likelihood of false brakefail declarations.

After declaring a brakefail, the built-in test function unit may continue to monitor the pressure command, the current command and the detected pressure in block 214. If, at any point after the brakefail has been declared, the detected pressure is within the pressure tolerance of the pressure command and the current command is at a value other than the maximum current or minimum current plus or minus the current tolerance, then the built-in test function unit may clear the brakefail in block 216. Otherwise, the method 200 may return to block 212 where the brakefail is still declared. In various embodiments, the detected pressure must be within the pressure tolerance of the pressure command and the current command must be at a value other than the maximum current or the minimum current plus or minus the tolerance for a predetermined amount of time, such as two seconds, before the brakefail will be cleared. This decreases the likelihood of a false clearing of the brakefail.

Figure 3:
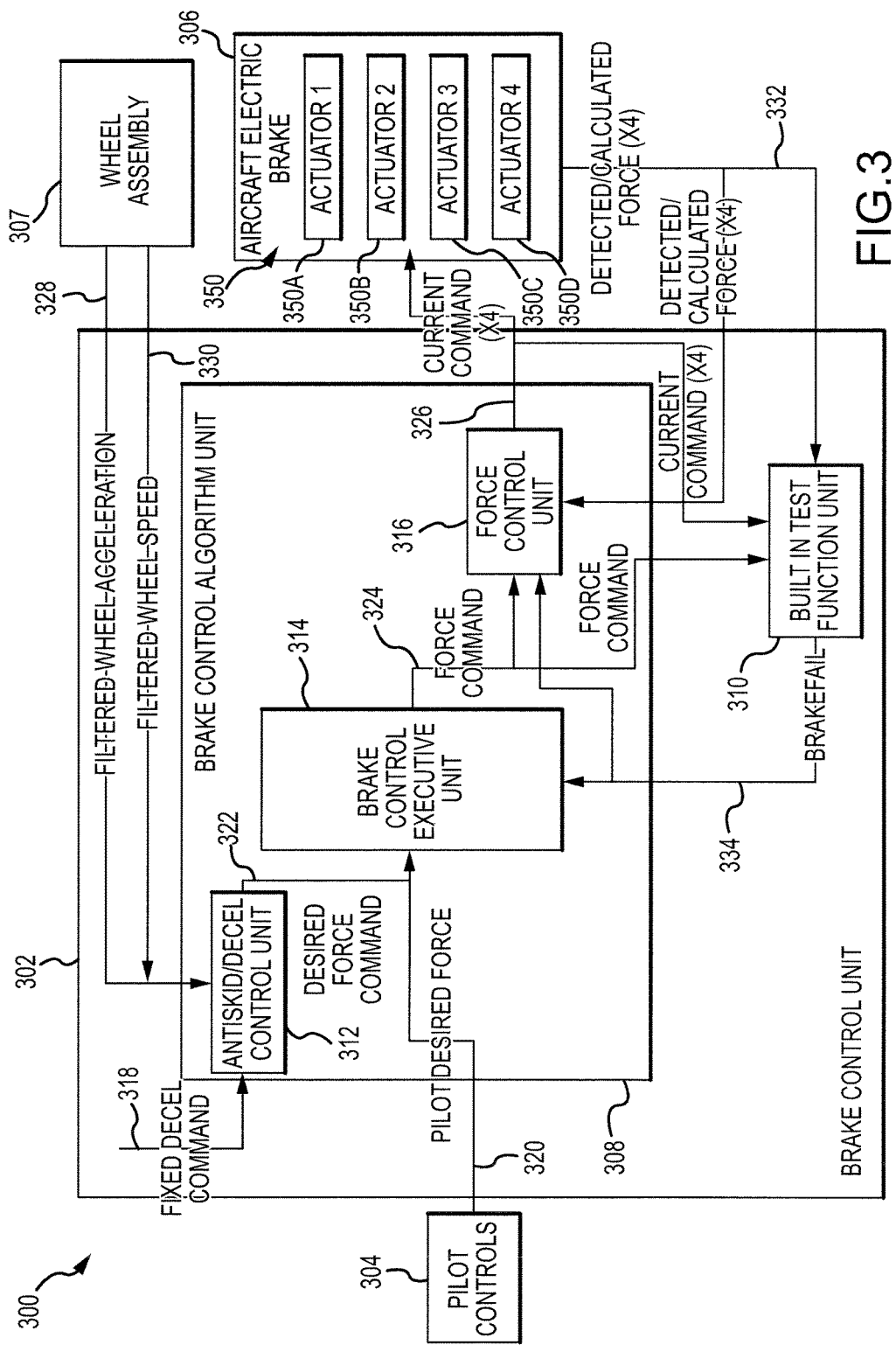
FIG. 3 is a block diagram showing a braking system of an aircraft having an electronic brake and for implementing a two-stage determination of a brakefail event of the braking system, in accordance with various embodiments.

Turning now to FIG. 3, another aircraft brake system (or system) 300 may provide a two-stage approach for determining whether a brakefail has occurred regarding an aircraft electric brake 306. The system 300 is similar to the system 100 of FIG. 1, and like numbered components of each system 100, 300 perform similar functions. The system 300, however, is designed using an electric brake instead of a pressure brake. The system 300 includes a brake control unit (BCU) 302, a set of pilot controls 304, the aircraft electric brake 306 and a wheel assembly 307.

The BCU 302 includes a brake control algorithm unit 308 that is used to control the aircraft electric brake 306. The BCU 302 also includes a built-in test function unit 310 for determining whether a brakefail event has occurred. In particular, the brake control algorithm unit 308 can receive a pilot desired force value 320 from the pilot controls 304 corresponding to a brake request by the pilot. Likewise, the brake control executive unit 314 can receive a desired force command value 322 received from an antiskid/deceleration control unit 312. As with the antiskid/deceleration control unit 112 of FIG. 1, the antiskid/deceleration control unit 312 may generate the desired force command value 322 based on a fixed deceleration command value 318, a filtered wheel acceleration value 328 and a filtered wheel speed value 330. The brake control executive unit 314 may output a force command value 324 that is equal to a minimum of the pilot desired force value 320 or the desired force command value 322.

The aircraft electric brake 306 may include a plurality of electronic actuators 350 including a first electronic actuator 350A, a second electronic actuator 350B, a third electronic actuator 350C and a fourth electronic actuator 350D. Each of the electronic actuators 350 may apply a force to one or more disks of the aircraft electric brake 306 to decelerate angular velocity of the wheel assembly 307. The force may be determined based on a received signal from the BCU 302. In particular, the force control unit 316 may be designed to provide a current command value 326 to each of the electronic actuators 350 based on the force command value 324. The current command value 326 may instruct each of the electronic actuators 350 to apply a desired amount of force to the disks. In various embodiments, the force command value 324 may be determined for each of the electronic actuators 350 and, in further embodiments, the force control unit 316 may determine each of the current command values 326 based on a single force command value 324.

In various embodiments, a force sensor may be coupled to each of the electronic actuators 350 and designed to detect a force applied by each of the electronic actuators 350. In further embodiments, logic may be implemented in the BCU 302 and/or the aircraft electric brake 306 for calculating the force applied by each of the electronic actuators 350. The current command value 326 may also be based on a detected and/or calculated force applied by each of the electronic actuators 350. In that regard, the current command value 326 may be determined based on a closed loop system.

The built-in test function unit 310 may be designed to determine whether a brakefail has occurred within the aircraft electric brake 306 based on the force command value 324, the detected/calculated force value 332 from each of the electronic actuators 350 and the current command value 326 provided to each of the electronic actuators 350. If a brakefail has been determined by the built-in test function unit 310, the built-in test function unit 310 may report the brakefail to the brake control executive unit 314 via a brakefail value 334. The brakefail value 334 may also be provided to the force control unit 316 for implementation of open-loop force control.

The built-in test function unit 310 may compare the detected/calculated force value 332 from each of the electronic actuators 350 to the force command value 324. If the detected/calculated force value 332 for each of the electronic actuators 350 is not within a predetermined force tolerance of the force command value 324 for a predetermined amount of time, the built-in test function unit 310 may determine that the corresponding actuator is in an actuator fail state. The comparison of the force command value 324 to the detected/calculated force value 332 is the fine determination stage.

As with the pressure control unit 116 of FIG. 1, the force control unit 316 may continue to increase an amount of current to any of the electronic actuators 350 in which the force sensor and/or the calculation of force therefrom is not functioning properly. Thus, the built-in test function unit 310 may compare the current command value 326 for each of the electronic actuators 350 to a minimum current value and a maximum current value. If the detected/calculated force value 332 for each of the electronic actuators 350 is within a predetermined force tolerance of the force command value 324 and the current command value 326 for any of the electronic actuators 350 is within a current tolerance of the maximum current value or the minimum current value, the built-in test function unit 310 may determine that the corresponding electronic actuator is in an actuator fail state. In various embodiments, the current command value 326 should be within the current tolerance of the maximum current value or the minimum current value for a predetermined amount of time before the electronic actuator will be declared to be in the actuator fail state.

Because the aircraft electric brake 306 includes four separately controlled electronic actuators 350, a desired force corresponding to the force command value 324 may be applied to the disk brake system even if one or more of the electronic actuators 350 is in an actuator fail state. Thus, the built-in test function unit 310 may be designed to declare a brakefail only if a predetermined number of the electronic actuators 350, such as two of the electronic actuators 350, are in an actuator fail state. However, the built-in test function unit 310 may report any of the electronic actuators 350 that are in the actuator fail state to the brake control executive unit 314 and/or any other unit.

Figure 4:
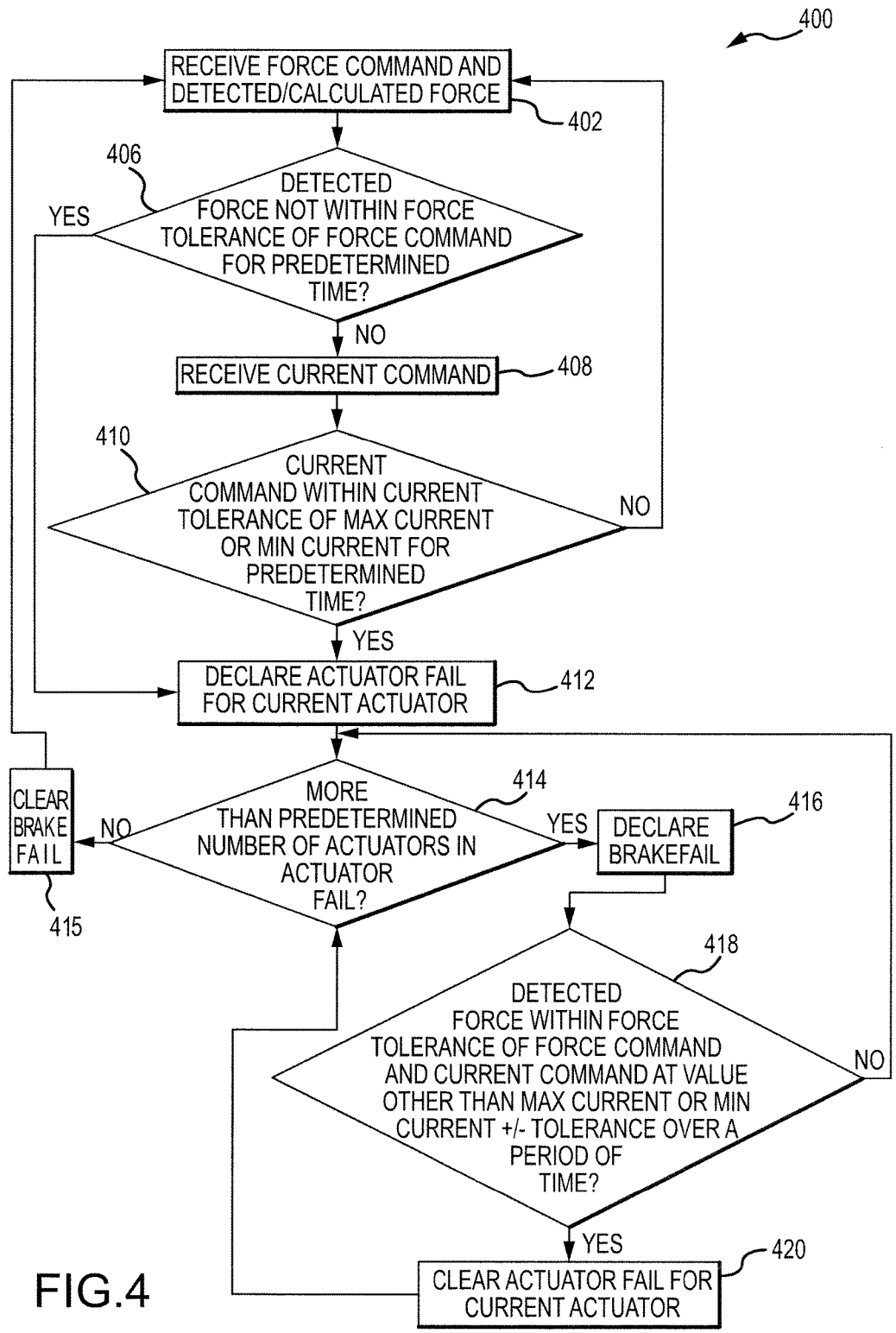
FIG. 4 is a flowchart showing a method for a two-stage determination of the brakefail event of FIG. 3, in accordance with various embodiments.

Turning to FIG. 4, a method 400 for a two-stage determination of a brakefail in an aircraft electric brake may begin at block 402. The method 400 may be performed by a built-in test function unit such as the built-in test function unit 310 of FIG. 3. In block 402, the built-in test function unit may receive a force command along with a detected and/or calculated force from one of a plurality of actuators.

In block 406, the built-in test function unit may determine whether the detected/calculated force is within the force tolerance of the force command for the corresponding actuator. If the detected force for the corresponding actuator is not within the predetermined force tolerance of the force command, the method 400 may proceed to block 412 where an actuator fail event may be declared for the current actuator. In various embodiments, the method 400 will not proceed to declare an actuator fail until the difference between the detected/calculated force and the force command is greater than the force tolerance for a predetermined amount of time, such as between 0.5 and 3.5 seconds, or between 1 and 3 seconds, or 2 seconds. However, if the detected force is within the force tolerance of the force command for the current actuator, the method 400 may proceed to block 408. In block 408, the built-in test function unit may receive the current command so that it can determine whether one or more actuator is in an actuator fail state based on the current command.

In block 410, the built-in test function unit may compare the current command to a maximum current value and a minimum current value. If the current command is within a current tolerance of the maximum current or the minimum current, the built-in test function unit may determine that the current actuator is in the actuator fail state and proceed to block 412. In some embodiments, the method 400 will not proceed to block 412 unless the current command is within the current tolerance of the maximum current value or the minimum current value for a predetermined amount of time, such as between 0.5 and 3.5 seconds, or between 1 and 3 seconds, or 2 seconds. If, on the other hand, the current command value is not within the current tolerance of the maximum current value or the minimum current value, then the method 400 may return to block 402.

In block 414, the built-in test function unit may determine how many of the actuators are in the actuator fail state. If a predetermined number of actuators are in the actuator fail state, then the method 400 may proceed to block 416. The predetermined number of actuators may correspond to a number of actuators without which the aircraft electric brake could not apply a maximum amount of force. If fewer than the predetermined number of actuators are in the actuator fail state, then the method 400 may clear the brakefail condition in block 415, if previously set, and then return to block 402. However, if the predetermined number of actuators, or more than the predetermined number of actuators, are in the actuator fail state, then the built-in test function unit may declare that a brakefail event has occurred in block 416 and report the brakefail to the brake control executive unit and/or force control unit.

In block 418, the built-in test function unit may determine, for each of the actuators in the actuator fail state, whether the detected force is within the force tolerance of the force command and whether the current command is at a value not within the current tolerance of the maximum current or the minimum current. If not, the method 400 may return to block 414 in case another actuator is no longer in the actuator fail state. However, if so, the method 400 may proceed to block 420 where the actuator fail state for the current actuator will be cleared. In various embodiments, the built-in test function unit may ensure that these conditions are met for a predetermined period of time, such as two seconds, prior to clearing the actuator fail state. After clearing the actuator fail state in block 420, the method may then proceed to block 414 where the built-in test function unit determines whether the predetermined number of actuators are still in the actuator fail state.

Referring now to FIGS. 1 and 3, the systems 100 and 300 may control the aircraft hydraulic brake 106 and the aircraft electric brake 306 using an open loop control method if either has been declared to be in brakefail. As a result, the pressure control unit 116 may only determine the current command value 126 based on the pressure command and the force control unit 316 may only control the current command values 326 based on the force command value 324. This tends to eliminate incorrect information received from the aircraft hydraulic brake 106 and the aircraft electric brake 306.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for two-stage determination of a brakefail of an aircraft brake system comprising:
    an aircraft brake configured to receive a current command value, convert the current command value to a braking pressure, and output a detected pressure value corresponding to the braking pressure; and
    a brake control unit (BCU) configured to:
        determine a pressure command value,
        convert the pressure command value to the current command value,
        determine whether a brakefail event has occurred based on the pressure command value, the current command value, and the detected pressure value, and
        determine that the brakefail event has occurred in response to determining that the current command value is within a predetermined current tolerance of at least one of a maximum current value or a minimum current value.

2. The system of claim 1, wherein the BCU is further configured to determine that the brakefail event has occurred in response to determining that the detected pressure value is greater than or less than the pressure command value by at least a predetermined pressure tolerance.

3. The system of claim 2, wherein the BCU is further configured to determine that the brakefail event has occurred in response to determining that the detected pressure value is greater than or less than the pressure command value by at least the predetermined pressure tolerance or that the current command value is within the predetermined current tolerance of the maximum current value or the minimum current value for a predetermined period of time.

4. The system of claim 3, wherein the BCU is configured to determine that the brakefail event has stopped occurring in response to determining that the detected pressure value is within the predetermined pressure tolerance of the pressure command value and that the current command value is less than the maximum current value minus the predetermined current tolerance and is greater than a sum of the minimum current value and the predetermined current tolerance for the predetermined period of time.

5. The system of claim 1, wherein the pressure command value is received from a brake control executive unit and is determined based on a pilot desired pressure value and a desired pressure command value.

6. The system of claim 1, wherein the current command value is determined using a feedback loop based on the pressure command value and the detected pressure value when the brakefail event has not occurred.

7. The system of claim 6, wherein the current command value is determined using an open loop based on the pressure command value when the brakefail event has occurred.

8. A system for two-stage determination of a brakefail of an aircraft brake system comprising:
    an aircraft brake having a plurality of electronic actuators each configured to receive a current command value, to convert the current command value into a force, and to output a detected or calculated force value; and
    a brake control unit (BCU) configured to:
        determine a force command value,
        convert the force command value to the current command value,
        determine whether a brakefail event has occurred based on the force command value, the current command value, and the detected or calculated force value from each of the plurality of electronic actuators,
        determine that an actuator fail event has occurred for an electronic actuator of the plurality of electronic actuators in response to determining that at least one of the detected or calculated force value for the electronic actuator is at least one of greater than or less than the force command value by at least a predetermined force tolerance, and
        determine that the brakefail event has occurred in response to determining that the actuator fail event has occurred for a predetermined quantity of the plurality of electronic actuators.

9. The system of claim 8, wherein the BCU is further configured to determine that the actuator fail event has occurred for the electronic actuator in response to determining that the current command value is within a predetermined current tolerance of a maximum current value or a minimum current value for the electronic actuator.

10. The system of claim 9, wherein the BCU is further configured to determine that the actuator fail event has occurred in response to determining that the detected or calculated force value is greater than or less than the force command value by at least the predetermined force tolerance or that the current command value is within the predetermined current tolerance of the maximum current value or the minimum current value for a predetermined period of time.

11. The system of claim 10, wherein the BCU is configured to determine that the actuator fail event has stopped occurring in response to determining that the detected or calculated force value is within the predetermined force tolerance of the force command value and that the current command value is less than the maximum current value minus the predetermined current tolerance and is greater than a sum of the minimum current value and the predetermined current tolerance for the predetermined period of time.

12. The system of claim 11, wherein the BCU is configured to determine that the brakefail event has stopped occurring in response to determining that the actuator fail event is occurring for less than the predetermined number of the plurality of electronic actuators.

13. A method for two-stage determination of a brakefail of an aircraft brake system comprising:
    determining, by a brake control unit (BCU), a pressure command value or a force command value;
    converting, by the BCU, the pressure command value or the force command value to a current command value;
    receiving, by the BCU, a detected pressure value or a detected or calculated force value;
    determining, by the BCU, whether a brakefail event has occurred based on the pressure command value or the force command value, the current command value, and the detected pressure value or the detected or calculated force value;
    determining, by the BCU, that the brakefail event has occurred in response to determining that at least one of the detected pressure value is greater than or less than the pressure command value by at least a predetermined pressure tolerance or the current command value is within a predetermined current tolerance of a maximum current value or a minimum current value for a predetermined period of time; and
    determining, by the BCU, that the brakefail event has stopped occurring in response to determining that the detected pressure value is within the predetermined pressure tolerance of the pressure command value and that the current command value is less than the maximum current value minus the predetermined current tolerance and is greater than a sum of the minimum current value and the predetermined current tolerance for the predetermined period of time.

14. The method of claim 13, further comprising determining, by the BCU, that an actuator fail event has occurred for an electronic actuator of a plurality of electronic actuators of an aircraft brake in response to determining that at least one of the detected or calculated force value for the electronic actuator is greater than or less than the force command value by at least a predetermined force tolerance or the current command value is within a predetermined current tolerance of a maximum current value or a minimum current value for the electronic actuator for a predetermined period of time.

15. The method of claim 14, further comprising determining, by the BCU, that the brakefail event has occurred in response to determining that the actuator fail event has occurred for a predetermined number of the plurality of electronic actuators.

* * * * *